United States Patent [19]

Siemon

[11] Patent Number: 5,310,384
[45] Date of Patent: May 10, 1994

[54] CONTINUOUSLY VARIABLE TRANSMISSION BELT RATIO MEASUREMENT SYSTEM

[75] Inventor: Edward C. Siemon, Ithaca, N.Y.

[73] Assignee: Borg-Warner Automotive, Inc., Sterling Heights, Mich.

[21] Appl. No.: 38,476

[22] Filed: Mar. 29, 1993

[51] Int. Cl.⁵ .............................................. F16H 7/00
[52] U.S. Cl. .......................................... 474/70; 474/18; 474/101
[58] Field of Search ...................... 474/11, 12, 17, 18, 474/69, 70, 101, 102, 106–108; 475/206

[56] References Cited

U.S. PATENT DOCUMENTS

| | | | |
|---|---|---|---|
| 4,433,594 | 2/1984 | Smirl | 475/206 |
| 5,114,383 | 5/1992 | Hirano et al. | 474/18 |
| 5,161,433 | 11/1992 | Sakakibara et al. | 474/18 X |
| 5,178,044 | 1/1993 | Suzuki et al. | 474/18 X |

*Primary Examiner*—Thuy M. Bui
*Attorney, Agent, or Firm*—Willian Brinks Hofer

[57] ABSTRACT

A continuously variable transmission having a belt ratio measurement system. The continuously variable transmission contains a moveable sheave and a fixed sheave. The measurement system includes two tone wheels and pickups. The first tone wheel is mounted to the fixed sheave with a corresponding first pickup mounted proximate thereto. The second tone wheel is mounted to the moveable sheave with a corresponding second pickup mounted proximate thereto. The second tone wheel has angled teeth so that the signal sensed in the second pickup varies in relation to the axial position of the moveable sheave. By comparing the signal sensed by the first pickup with the signal sensed by the second pickup, the axial position of the moveable sheave, and thus the belt ratio of the transmission, may be determined.

13 Claims, 4 Drawing Sheets

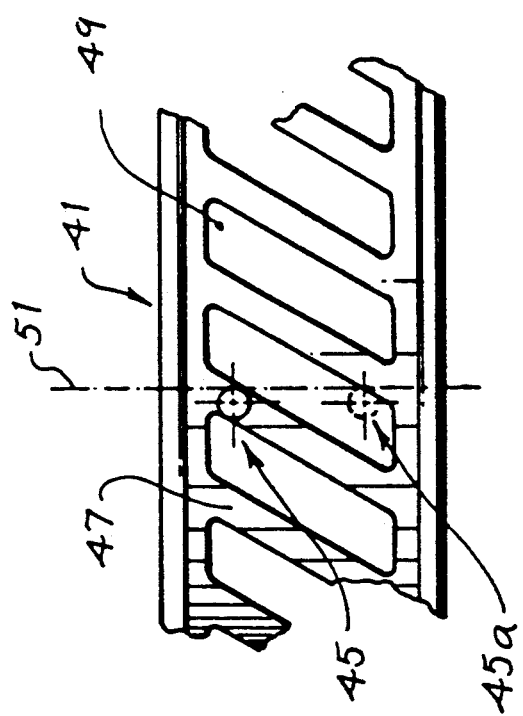
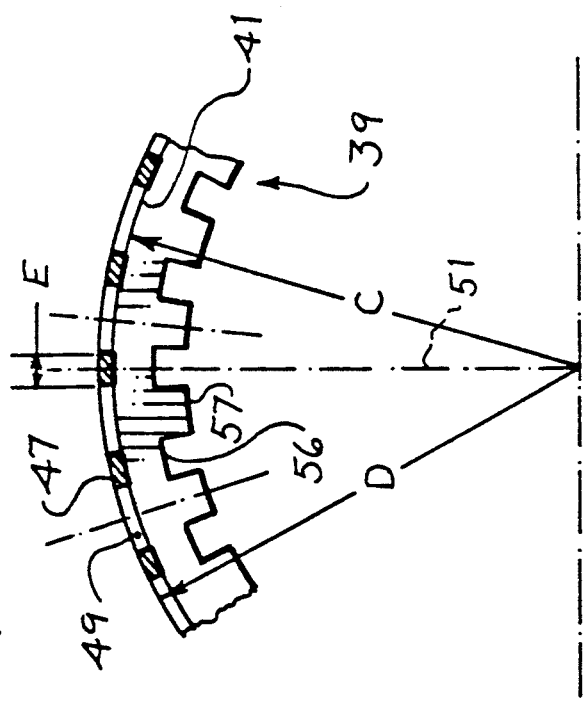

CONTINUOUSLY VARIABLE TRANSMISSION BELT RATIO MEASUREMENT SYSTEM

BACKGROUND OF THE INVENTION

This invention relates to a continuously variable transmission system and more particularly to a drive belt ratio measurement system.

A continuously variable transmission ("CVT"), generally utilizes a pair of adjustable pulleys, including a primary pulley and a secondary pulley. The primary pulley is mounted on an input shaft connected to an engine. In certain embodiments the primary pulley is connected to the engine through a torque converter. The secondary pulley is mounted on an output shaft connected to the drive train of the vehicle, typically through a clutch. One example of such a CVT is shown in Smirl, U.S. Pat. No. 4,433,594 entitled "Variable Pulley Transmission" which is incorporated herein by reference. A drive belt interconnects the pulleys and transfers power from the engine to the drive train through the frictional contact between the side faces of the drive belt and the contact faces of the adjustable pulleys. The side faces of the drive belt are shaped to correspond to the contact faces of the pulleys.

Each pulley includes two sheaves or flanges having conical side surfaces defining a V-shaped gap between the sheaves. At least one of the sheaves is moveable along the axis of the shaft so that the gap between the sheaves can be varied. When the gap width between the sheaves varies, the radial contact point of the drive belt also varies due to the conical shape of the side surfaces of the sheaves. Consequently, the effective radius of the pulleys vary along with the transmission drive ratio. Generally, as the effective diameter of the primary pulley is moved in one direction, the effective diameter of the secondary pulley is moved in the opposite direction. This permits a continuous adjustment of the drive ratio between the engine and the drive train, while maintaining the tautness of the belt.

Typically, the transmission belt ratio is determined by measuring the speed of the primary and secondary sheaves. The transmission belt ratio is then calculated by mathematically computing the ratio of the primary pulley's speed to the secondary pulley's speed. If, however, clamping forces of the sheaves on the chain belt are insufficient for the torque being transmitted, the belt may slip on the sheaves. This is undesirable because the efficiency of the transmission is greatly compromised. Although the sheave speed method of calculating the belt ratio adequately provides the actual belt ratio, it alone cannot be used to determine if belt slippage is occurring or if the system is operating at peak efficiency.

The present invention solves this problem by providing a mechanism that can determine the theoretical belt ratio. The mechanism can also compare the actual belt ratio to the theoretical belt ratio to anticipate an impending belt slip condition so that the appropriate corrective action can be taken to stop belt slippage and to prevent further belt slippage.

SUMMARY OF THE INVENTION

The present invention provides a continuously variable transmission and power train system that includes a mechanism for ascertaining the theoretical transmission belt ratio. The mechanism first determines the relative position of the moveable and the fixed sheave of one of the variable pulleys. The radial contact point of the belt on each of the sheave faces is determined from the relative axial position of the sheaves. The theoretical transmission belt ratio is then readily determined from the effective radius of the pulleys.

In one embodiment of the present invention, a pair of tone wheels and corresponding pickups, preferably magnetic pickups, are used to determine the axial position of the primary pulley's moveable sheave. The first tone wheel is mounted in a fixed position relative to the fixed sheave of the primary pulley and has, in proximity, a corresponding first pickup mounted on the transmission housing. Preferably, the first tone wheel is mounted on the fixed sheave. The first tone wheel has spaced apart teeth extending from its periphery. Alternatively, spaced apart slots may be formed in the wheel extending downward from the periphery of the wheel such that adjacent slots define a tooth.

The second tone wheel is mounted such that axial displacement of the moveable sheave results in an equal axial displacement of the wheel. Preferably, the second tone wheel is mounted on the moveable sheave of the primary pulley. A corresponding second pickup is mounted on the transmission housing in proximity to the second tone wheel. The second tone wheel includes spaced apart teeth extending from its periphery and at an angle relative to the axis of the wheel to define a helix. Alternatively, spaced apart slots may be formed in the wheel extending downward from the periphery of the wheel such that adjacent slots define a tooth. Of course, the slots are formed at an angle relative to the axis of the wheel such that the teeth defined by adjacent slots will also be at an angle relative to the axis of the wheel and will define a helix.

As the pulley rotates, each tone wheel rotates in proximity to its corresponding pickup to generate a signal. In particular, as the first tone wheel rotates, a first or fixed sheave signal is generated and as the second tone wheel rotates a second or moveable sheave signal is generated. Preferably, the signal generated is an electrical signal. When the moveable sheave is in a reference position the second or moveable sheave signal and the first or fixed sheave signal are in phase. The helical construction of the moveable sheave tone wheel causes a phase shift in the moveable sheave signal as the moveable sheave moves axially. Thus, the relative phase angle changes between the signal for the fixed sheave pickup sensor and the moveable sheave pickup sensor. Measurement of the change in the relative phase angle indicates the axial position of the moveable sheave. From the axial position of the moveable sheave, the theoretical belt ratio may be readily determined.

A microcomputer chip is used to evaluate the change in the relative phase angle, to determine the theoretical belt ratio, and to compare the theoretical belt ratio with the actual belt ratio. Based on the above actions, an impending belt slip condition can be determined so that appropriate corrective action to stop belt slippage and prevent further belt slippage can be implemented.

For a better understanding of these and other aspects of the present invention, reference should be made to the following detailed description taken in conjunction with the accompanying drawings.

BRIEF DESCRIPTION OF THE DRAWINGS

FIG. 5 is an enlarged view of a portion of the first or fixed sheave tone wheel and a portion of the second or moveable sheave tone wheel taken along line 5—5 in FIG. 2.

FIG. 6 is an enlarged top view of a portion of the second or moveable sheave tone wheel and its associated pickup taken along line 6—6 in FIG. 2.

DETAILED DESCRIPTION OF THE INVENTION AND PREFERRED EMBODIMENTS

Figure 1:
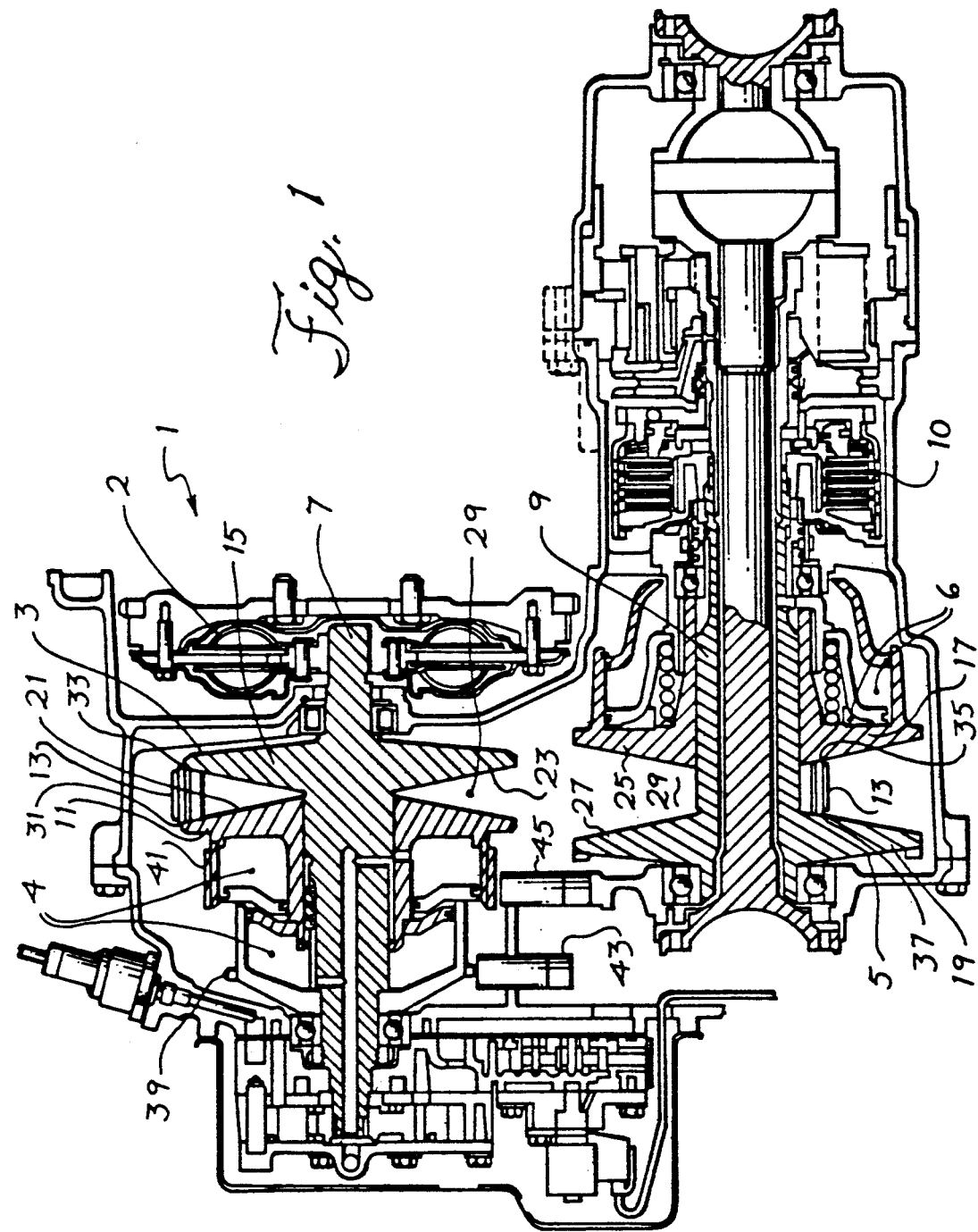
FIG. 1 is a sectional view of the preferred embodiment the continuously variable transmission system of the present invention and shows the relationship of the first and second tone wheels and their corresponding pickups.

Referring to FIG. 1, the CVT system 1 that incorporates the present invention is shown. The CVT system 1 includes a first adjustable pulley 3 and a second adjustable pulley 5 interconnected by a belt 13. A primary shaft 7 carries the first adjustable pulley 3 and a secondary shaft 9 carries the second adjustable pulley 5.

The primary shaft 7 is driven by a power input, typically an engine (not shown). Preferably the primary shaft 7 communicates with the power input through a torsional damper 2. In an alternative embodiment, the primary shaft 7 may communicate with the power input through a torque converter. The torque converter is used to multiply the output torque of the engine at low RPM. Both the torsional damper and the torque converter serve to isolate torsional characteristics of the engine thus minimizing vibrations to the transmission 1. Other suitable torque input devices may be used such as a fluid coupling, a wet friction clutch, or a dry friction clutch.

The secondary shaft 9 is connected to a wet friction clutch 10. The shaft 9 is also connected to a direct clutch (not shown) and a compound planetary gear set (not shown) to provide forward, neutral, and reverse gears. Thereafter power may be fed to a differential to provide power to the wheels.

The first adjustable pulley 3 includes a moveable sheave 11 and a fixed sheave 15. The secondary adjustable pulley also includes a moveable sheave 17 and a fixed sheave 19. Sheaves 11, 15, 17, and 19 each have a conical side surface 21, 23, 25, and 27, respectively, such that a V shaped gap 29 is formed between the primary moveable sheave 11 and the primary fixed sheave 15, and between the secondary moveable sheave 17 and the secondary fixed sheave 19. The belt 13, that interconnects the pulleys 3 and 5, contacts the primary pulley 3 at contact points 31 and 33 on the conical surfaces 21 and 23, respectively. The belt 13 also contacts the secondary pulley 5 at contact points 35 and 37 on the conical surfaces 25 and 27, respectively. Due to the conical shape of the side surfaces 21, 23, 25, and 27, when the width of the gap 29 is changed by moving the moveable sheaves 11 and 17, the radial contact points 31, 33, 35, and 37 of the drive belt 13 will also vary. For example, as illustrated in FIG. 1, the primary pulley 3 has a smaller gap width than the secondary pulley 5. Accordingly, the primary pulley 3, as illustrated in FIG. 1, has a larger effective radius than the secondary pulley 5.

Preferably, the moveable sheaves 11 and 17 are hydraulically controlled. Both adjustable pulleys 3 and 5 communicate with hydraulic reservoirs 4 and 6, respectively. Through variation of hydraulic pressure, the moveable sheaves 11 and 17 are moved. Movement of the moveable sheaves 11 and 17 causes the belt 13 to move within the gap 29, as best seen in a comparison of the primary pulley 3 and the secondary pulley 5, as shown in FIG. 1. In such a manner a continuously variable transmission ratio is accomplished.

Further description and details on the construction and operation of an adjustable pulley used in a CVT may be found in U.S. Pat. No. 5,006,092 entitled "Continuously Variable Transmission Power Train Configuration", which is incorporated herein by reference. The adjustable pulleys 3 and 5 may be controlled by a system such as the system disclosed in Petzold et al. U.S. Pat. No. 4,811,225, entitled "Ratio Control Technique for Continuously Variable Transmission," assigned to the Assignee of the present invention, and incorporated herein by reference. Any adjustable pulley control system, however, which is suitable and known to those skilled in the art may be used.

Figure 2:
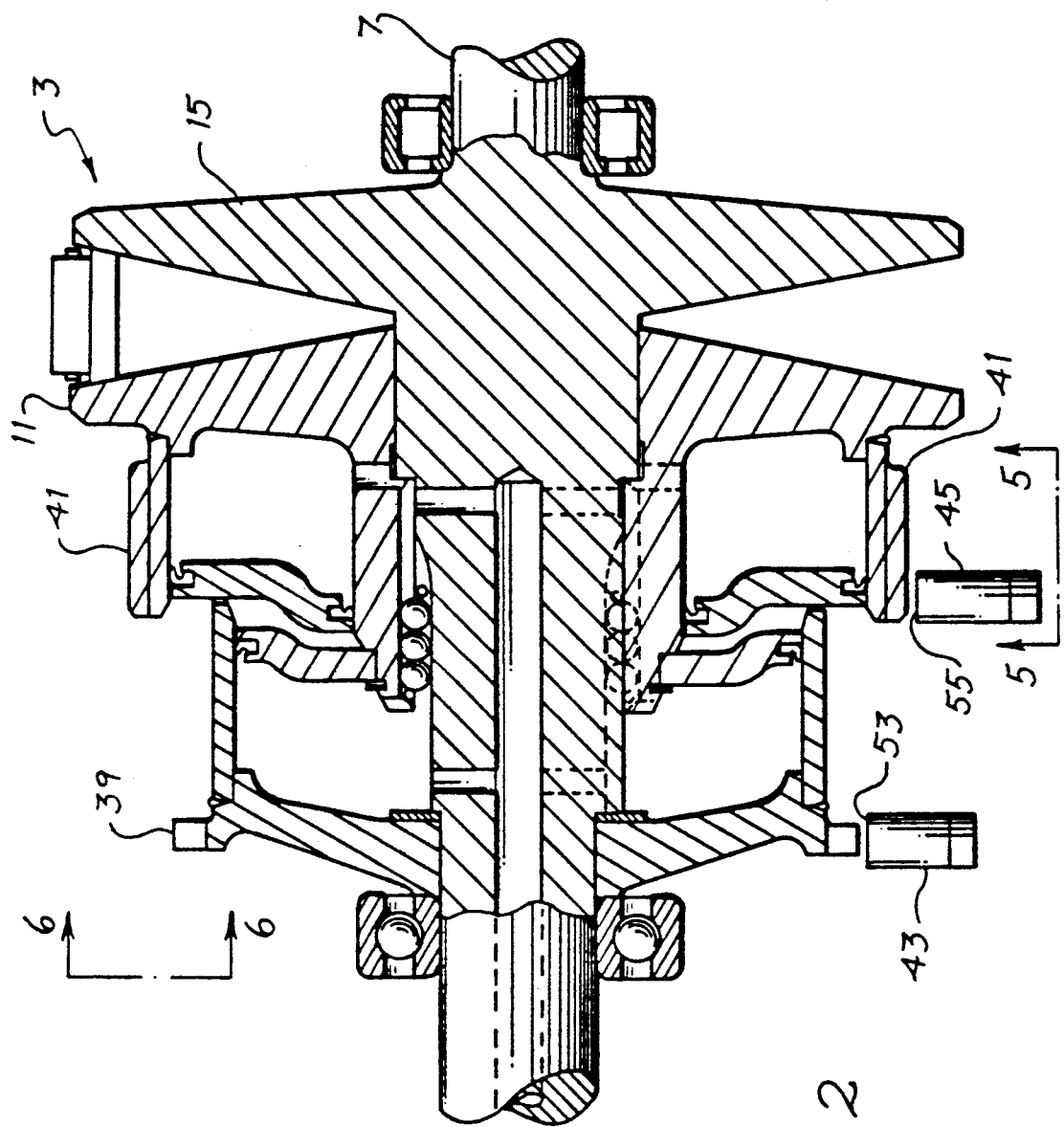
FIG. 2 is an enlarged sectional view of the primary pulley of the continuously variable transmission system illustrated FIG. 1 that shows the relationship of the first and second tone wheels and their corresponding pickups.

Referring now to FIG. 2, the present invention uses two tone wheels 39 and 41 and corresponding pickups 43 and 45. The tone wheels 39 and 41 and the pickups 43 and 45 may be associated with either the primary pulley 3 or the secondary pulley 5. Preferably, as illustrated in FIGS. 1 and 2, the tone wheels 39 and 41, and their corresponding pickups 43 and 45 are associated with the primary pulley 3.

In this preferred embodiment, the first tone wheel 39 is mounted in a fixed axial position relative to the fixed sheave 15. Preferably, the first tone wheel 39 is mounted on the primary fixed sheave 15 and rotates therewith about the shaft 7. The first pickup 43 is mounted in a stationary position spaced from, but proximate to, the first tone wheel 39. Preferably, the first pickup 43 is attached to the transmission case.

The second tone wheel 41 is mounted such that axial displacement of the moveable sheave results in an equal displacement of the wheel. Preferably, the second tone wheel is mounted on the primary moveable sheave 11 and rotates therewith about the shaft 7. The second pickup 45 is mounted in a stationary position spaced from, but proximate to, the second tone wheel 41. Preferably, the second pickup 45 is attached to the transmission case. Most preferably, the pickups 43 and 45 are magnetic pickups.

It will be readily apparent to one skilled in the art that in an alternative embodiment of the present invention, the second tone wheel 41 may be mounted in a stationary position with the second pickup 45 being attached to the primary moveable sheave 11. The present invention merely requires that the second tone wheel 41 and the second pickup 45 be mounted such that any axial displacement of the primary moveable sheave 11 results in an equal axial displacement between the second tone wheel 41 and the second pickup 45.

The operation of the pickups 43 and 45 and the tone wheels 39 and 41 are as follows. Pickup 43 includes a tip 53 and pickup 45 includes a tip 55. Each pickup 43 and 45 emits from its respective tip a magnetic field which extends in the volume proximate thereto. As a ferrous object approaches the tips 53 and 55, the magnetic field increases. As the ferrous object passes away from the pickups, the magnetic field decreases. When the magnetic field decreases it induces a voltage in the pickup in one direction and when it increases it induces a voltage in the pickup in the opposite direction.

Figure 3:
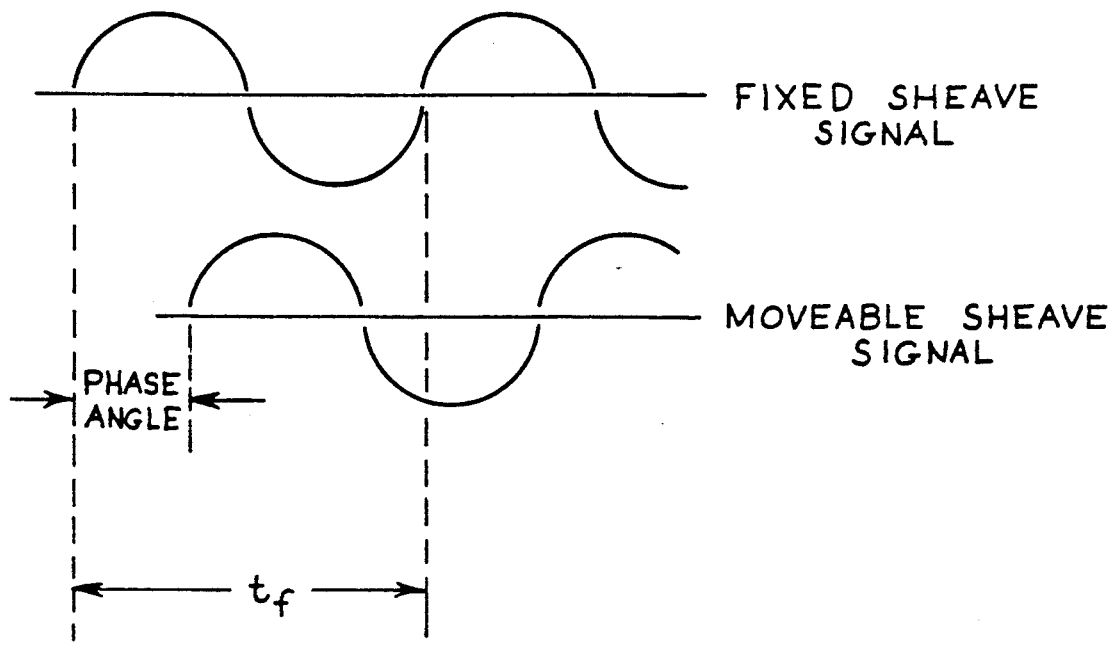
FIG. 3 is a graphical illustration of typical voltage waveforms generated in the pickup sensors used in the present invention.
Figure 4:
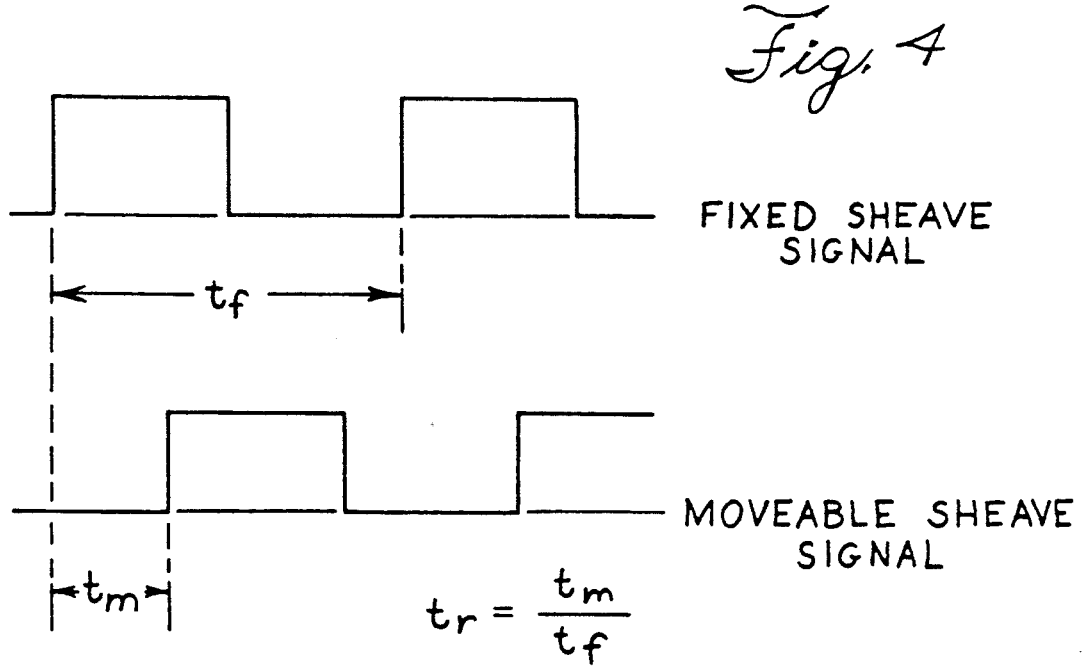
FIG. 4 is a graphical illustration of a squarewave pulse generated by a microcomputer from the signal from the pickups sensors illustrated by FIG. 3.

Referring to the first tone wheel 39, for example, when a tooth on the wheel 39 approaches the pickup 43, the magnetic field increases to induce a voltage in one direction that reaches its peak when the tooth is adjacent the tip 53. Of course, when the tooth moves away, the magnetic field decreases to induce a voltage in the opposite direction that reaches its peak when the midpoint of the space between the teeth is adjacent the tip 53. Accordingly, the induced voltage is in the shape of a sine wave. A typical voltage waveform from a pickup is shown in FIG. 3.

In accordance with a preferred embodiment of the present invention, as illustrated in FIG. 5, the fixed tone wheel 39 includes a series of equally spaced apart teeth 56 along its perimeter. The teeth 56 are spaced apart by slots 57 that, of course, are also equally spaced apart. As shown in FIG. 5, the teeth 56 extend from the periphery of the wheel 39. Since, the operation of the pickup 43 relies on successively increasing and decreasing the magnetic field, any means to accomplish an increase in the magnetic field followed by a decrease in the magnetic field is contemplated by the present invention. For example, spaced apart notches or slots that extend downward from the periphery of the wheel 39 could be provided so that adjacent slots define a tooth. It will be understood by one skilled in the art that this embodiment is an alternative to providing a wheel 39 having teeth protruding from its periphery.

Accordingly, when the tooth 56 passes the tip 53 of the first pickup 43 (FIG. 2), a voltage cycle is induced, i.e., the magnetic field increases as the tooth passes since it is physically closer to the pickup, and the magnetic field decreases once the tooth has passed. Each time a tooth 56 passes the second pickup 43 a pulse is created. It will be appreciated that the frequency of the signal generated is directly proportional to the number of ferrous objects (or teeth) passing the pickup per unit of time.

The moveable tone wheel 41 includes a series of equally spaced apart slots 49 along its perimeter. Adjacent slots 49 define spaced apart teeth 47. As with the first tone wheel, the second tone wheel 41 may be provided with spaced apart teeth protruding from its periphery. As best seen in FIG. 6, the teeth 47 and the slots 49 are formed at an angle to the axis 51 of the second tone wheel 41 such that the teeth 47 form a helix. Preferably, the teeth 47 are formed at about a 30 degree angle to the axis 51. Because the second pickup 45 is fixed and the tone wheel 41 moves axially as the moveable sheave 11 moves axially, the relative axial position of the pickup 45, with respect to the wheel, changes as indicated by pickups 45 and 45a in FIG. 6. FIG. 6 illustrates the axial position limits of the second pickup 45 relative to the second tone wheel 41. As the moveable sheave 11 moves from a first extreme axial position to a second extreme axial position, the relative axial position of the second pickup 45 to the second tone wheel 41 changes from the position indicated by pickup 45 to the position indicated by pickup 45a. Accordingly, the frequency at which the teeth 47 pass the pickup 45 shifts, causing the generated signal to shift and undergo a voltage crossing, i.e., a phase shift.

The fixed tone wheel 39, on the other hand, is fixed and has teeth parallel to the axis so that the signal generated in the first pickup 43 has a fixed voltage crossing. Accordingly, when the moveable sheave 11 is in a reference position, the moveable sheave signal and fixed sheave signal have a reference relation, typically in phase. As the moveable sheave 11 and the tone wheel 41 move axially, causing the voltage waveform from the pickup 45 to shift, the relative phase angle between the electrical signals from the two pickup sensors changes, as illustrated in FIG. 3. Of course, the phase angle is directly related to the time ratio of the zero voltage crossings of the two electrical signals from the pickups 43 and 45. By measuring the resultant phase angle, the axial position of the moveable sheave 11 is determined. From the axial position of the moveable sheave 11, the position of the radial contact point of the belt 13 is known so that the theoretical belt ratio is determined.

In accordance with a preferred embodiment of the present invention, a microcomputer is used to determine the relative axial positions of the primary moveable sheave 11 and the primary fixed sheave 15 and to calculate the theoretical belt ratio. The signals, represented by the sine waves illustrated in FIG. 3, from the two pickups 43 and 45 are used as an input into the microcomputer. These signals are converted by circuitry in the microcomputer to squarewave pulses. The squarewave pulse is sent to an input capture circuit of the microcomputer. The microcomputer then determines the time difference ($t_f$) between two successive zero voltage crossings generated by the teeth 49 of the fixed sheave tone wheel 39. In particular, the input capture circuit contains a counter that counts the number of internal clock pulses between successive leading or rising edges of the fixed sheave squarewave pulses. The internal clock pulses are derived from the clock frequency of the microcomputer which is 1 MHz. The microcomputer also determines the time difference ($t_m$) of the zero voltage crossings generated by a tooth of the fixed sheave tone wheel 39, and the successive tooth of the moveable sheave tone wheel 41. In other words, the microcomputer also counts the number of internal clock pulses between successive leading or rising edges of the moveable sheave squarewave pulses and determines the difference $t_m$ between the leading edge of the squarewave pulse of the fixed sheave signal and the leading edge of the squarewave pulse of the moveable sheave signal. The microcomputer then calculates the time ratio ($t_f = t_m/t_f$). Since the time ratio is proportional to the position of the moveable sheave, the theoretical belt ratio is determined.

During operation of the CVT system 1, the actual drive ratio is determined using well known methods such as described above. The microcomputer receives a signal indicating the actual drive ratio and compares it to the theoretical drive ratio as determined above. If the actual drive ratio is different from the theoretical drive ratio, the microcomputer may be programmed to determine if there is a need for corrective action and then to implement corrective action such as activating a belt tensioner.

The above description explains the basic features of the invention. Various substitutions and modifications, other than those cited, can be made without departing from the scope of the following claims.

What is claimed is:

1. A mechanism for determining the theoretical belt ratio for a continuously variable transmission having a first variable-diameter pulley mounted on a first shaft and a second variable diameter pulley mounted on a second shaft, the pulleys being interconnected by a belt and having a fixed sheave and a moveable sheave, with a means for controlling the axial movement of the first moveable sheave and the second moveable sheave to alter the effective diameters of the first pulley and the second pulley to provide a continuously variable drive ratio, the mechanism comprising:

a first tone wheel mounted in a fixed position relative to the first fixed sheave;

a first pickup mounted such that the rotation of the first tone wheel induces a voltage in the first pickup;

a second tone wheel including teeth along its perimeter formed at an angle to the axis of the second tone wheel; and, a second pickup whereby the second tone wheel and the second pickup are mounted such that axial displacement of the first moveable sheave results in an equal axial displacement between the second tone wheel and the second pickup, the second tone wheel and the second pickup further being mounted such that the rotation of the second tone wheel induces a voltage in the second pickup, wherein the voltage induced in the second pickup varies with the axial displacement between the second pickup and the second tone wheel such that as the moveable sheave moves axially, the relative phase angle of the electrical signal from the first pickup and the second pickup changes.

2. The mechanism of claim 1 wherein the first variable diameter pulley is a primary pulley connected to a power input.

3. The mechanism of claim 1 wherein the first variable-diameter pulley is a secondary pulley connected to a transmission output shaft.

4. The mechanism of claim 1 wherein the second tone wheel is attached to the first moveable sheave.

5. The mechanism of claim 1 wherein the second pickup is attached to the first moveable sheave.

6. The mechanism of claim 1 further including a microcomputer capable of:

a. reading the voltages induced in the first pickup and the second pickup;

b. determining a first time by measuring the time difference between two successive zero voltage crossings generated by the first tone wheel;

c. determining a second time by measuring the time difference between zero voltage crossings generated by the first tone wheel and a successive tooth of the second tone wheel;

d. calculating the ratio of the second time to the first time;

e. determining the axial position of the first moveable sheave from the ratio; and, f. determining the theoretical belt ratio from the axial position of the first moveable sheave.

7. The mechanism of claim 6 wherein the microcomputer is further capable of:

a. comparing the theoretical belt ratio to the actual transmission belt ratio;

b. determining if there is a need for corrective action; and, c. implementing the corrective action.

8. A mechanism for correcting belt slippage in a continuously variable transmission having a first variable-diameter pulley mounted on a first shaft and a second variable-diameter pulley mounted on a second shaft, the pulleys being interconnected by a belt, with each pulley having a fixed sheave and a moveable sheave, and a means for controlling axial movement of the first moveable sheave and the second moveable sheave to alter the effective diameters of the first pulley and the second pulley to provide a continuously variable drive ratio, the mechanism comprising:

a first tone wheel mounted in a fixed position relative to the first fixed sheave;

a first pickup mounted such that the rotation of the first tone wheel induces a voltage in the first pickup;

a second tone wheel including teeth along its perimeter formed at an angle to the axis of the second tone wheel, the second tone wheel mounted in a fixed position relative to the first moveable sheave;

a second pickup mounted such that the rotation of the second tone wheel induces a voltage in the second pickup, wherein the voltage induced in the second pickup varies with the axial movement of the first moveable sheave such that the relative phase angle of the electrical signal from the first pickup and the second pickup changes; and, a microcomputer capable of:

a. reading the voltages induced in the first pickup and the second pickup, b. determining a first time by measuring the time difference between two successive zero voltage crossings generated by the first tone wheel, c. determining a second time by measuring the time difference between zero voltage crossings generated by the first tone wheel and the successive tooth of the second tone wheel, d. calculating the ratio of the second time to the first time, e. determining the axial position of the first moveable sheave from the ratio, f. determining the theoretical belt ratio from the axial position of the first moveable sheave, g. comparing the theoretical belt ratio to the actual transmission belt ratio, h. determining if there is a need for corrective action, and i. implementing the corrective action.

9. The mechanism of claim 8 wherein the first variable-diameter pulley is a primary pulley connected to a power input.

10. The mechanism of claim 8 wherein the first variable-diameter pulley is a secondary pulley connected to a transmission output shaft.

11. The mechanism of claim 8 wherein the second tone wheel is attached to the first moveable sheave.

12. The mechanism of claim 8 wherein the second pickup is attached to the first moveable sheave.

13. A mechanism for correcting belt slippage in a continuously variable transmission having a primary variable-diameter pulley mounted on an input shaft and a secondary variable-diameter pulley mounted on an output shaft, the pulleys being interconnected by a belt and having a fixed sheave and a moveable sheave, with a means for controlling the axial movement of the primary moveable sheave and the secondary moveable sheave to alter the effective diameters of the primary pulley and the secondary pulley to provide a continuously variable drive ratio, the mechanism comprising:

a first tone wheel mounted on the primary fixed sheave, the tone wheel further having spaced apart teeth about its periphery;

a first pickup mounted such that rotation of the first tone wheel induces a voltage in the first pickup;

a second tone wheel mounted on the primary moveable sheave, the second tone wheel including teeth along its perimeter formed at an angle to the axis of the second tone wheel;

a second pickup mounted such that rotation of the second tone wheel induces a voltage in the second pickup, the voltage induced in the second pickup varying with the axial movement of the primary moveable sheave causing a change in the relative phase angle, between the electrical signal from the first pickup and the second pickup; and, a computer capable of performing the steps of:
  a. reading the voltages generated by the first and second pickups,
  b. determining a first time by measuring the time difference between two successive zero voltage crossings generated by the first tone wheel,
  c. determining a second time by measuring the time difference between zero voltage crossings generated by the first tone wheel and the successive tooth of the second tone wheel,
  d. calculating the ratio of the second time to the first time,
  e. determining the axial position of the first moveable sheave from the ratio,
  f. determining a theoretical drive ratio from the axial position of the first moveable sheave,
  g. comparing the theoretical drive ratio to the actual transmission belt ratio,
  h. determining if there is a need for corrective action, and
  i. implementing the corrective action.

* * * * *

UNITED STATES PATENT AND TRADEMARK OFFICE
CERTIFICATE OF CORRECTION

PATENT NO. : 5,310,384
DATED : May 10, 1994
INVENTOR(S) : Edward C. Siemon

It is certified that error appears in the above-indentified patent and that said Letters Patent is hereby corrected as shown below:

On the Title Page : Item [56]

In column 2 after "Attorney, Agent, or Firm--Willian Brinks Hofer" add --Gilson & Lione--.

In column 1, line 34, delete "vary" and substitute --varies--.

In column 1, line 66, delete "mechanismfor" and substitute --mechanism for--.

In column 2, line 68, after "ment" insert --of--.

In column 3, line 6, after "illustrated" insert --in--.

In column 3, line 14, delete "pickups" and substitute --pickup--.

UNITED STATES PATENT AND TRADEMARK OFFICE
CERTIFICATE OF CORRECTION

PATENT NO. : 5,310,384
DATED : May 10, 1994
INVENTOR(S) : Edward C. Siemon

It is certified that error appears in the above-indentified patent and that said Letters Patent is hereby corrected as shown below:

In column 5, line 24, after "Since" delete ",".

In column 6, line 49, delete the first occurrence of $t_f$ and substitute $t_r$.

In the Claims

In claim 2, lines 1-2, delete "variable diameter" and substitute --variable-diameter--.

In claim 8, line 27, after "and" delete "." and substitute --,--.

Signed and Sealed this

Twenty-fourth Day of October, 1995

Attest:

*Attesting Officer*

BRUCE LEHMAN

*Commissioner of Patents and Trademarks*